3,184,345
SUBMERGED ARC WELDING COMPOSITION

Zoltan E. Kerekes, Carteret, N.J., assignor to Foster Wheeler Corporation, New York, N.Y., a corporation of New York
No Drawing. Filed July 31, 1961, Ser. No. 127,880
9 Claims. (Cl. 148—26)

The present invention relates to welding or flux compositions, and particularly to compositions for use in depositing weld metals of nickel and nickel base alloys and nickel-chromium-iron alloys, commonly sold under the trademark "Inconel," in a submerged arc welding process. The welding composition, or so called flux, is placed on the work in the course of the welding operation providing, on fusion, a protective blanket over the pool of molten metal.

A number of problems are experienced specific to welding with nickel, nickel base and nickel-chromium-iron alloys. One problem is that nickel or nickel alloys are expensive and used only where the requirements justify such use; for instance, in the cladding of nuclear steam generators, and in the cladding of surfaces subjected to intense corrosion. Accordingly, deposited weld metals of the "Inconel" type must meet rigid specifications, one being that the weld beads must have sufficient ductility to bend without the formation of cracks.

Heretofore, submerged arc fluxes have had a high silica or silicate content. During the welding operation, there is a tendency for silicon to be transferred from the molten flux to the molten weld, and the silicon tends to form within the weld a nickel-iron-silicon phase which precipitates at grain boundaries and embrittles the weld or reduces its ductility.

Also, the weld beads must be clean and free of nickel and chromium oxide deposits, and the flux, particularly for multi-pass welds, must be readily removable from the solidified weld metal. Various mechanisms have been proposed to accomplish these purposes. For instance, with respect to a self-removing flux, it has been proposed to provide a flux composition which solidifies subsequent to solidification of the weld metal and which has a different coefficient of expansion from that of the weld metal. But to the best of our knowledge, no composition has been found prior to the present invention which solves these problems with "Inconel" without detracting from other qualities desired in the weld.

The weld bead also must be uniform and free of depressions and surface irregularities, and accordingly, the flux must have a viscosity and surface tension which provides the desired uniformity. The viscosity and surface tension, as a function of the acidity or basicity of the flux, is important in that if the flux is too basic, it is too fluid and has too high a surface tension to provide a uniform bead. On the other hand, if the flux is too acid, it is too viscous and has too low a surface tension to provide the desired bead.

Other requirements of the flux are that the flux protect the molten weld from atmospheric contamination and improve the annealing of the weld, both aspects being important with the use of "Inconel." In these respects, and according to the invention, it is proposed to establish a flux shield which solidifies before or simultaneously with solidification of the weld metal and which thereby protects the weld from atmospheric contamination, shapes the weld bead, and provides a heat insulating layer which slows down cooling of the weld, permitting the escape of gases from the weld and improving the annealing thereof.

A number of other problems are experienced specific to fluxes which must be considered in the welding of "Inconel" alloys. For instance, high temperatures encountered in the arc and agitation of the weld metal by the arc may cause a reaction between the flux and the metal to the detriment of the weld, so that care must be taken in the selection of materials in the flux. Also, the high temperatures involved may cause depletion of amounts of alloying elements in the welding rod or wire from which the metal is deposited, which may be compensated for by additions to the flux.

In accordance with the present invention, it has been found that an essentially neutral or slightly basic flux composition provides, for "Inconel," the necessary surface tension and viscosity to obtain a uniform bead, and that a number of acid and base constituents, one being aluminum oxide, may be proportioned so as to obtain not only an essentially neutral or slightly basic flux, but also a self-removing flux having a solidification temperature below that of the weld metal and a different coefficient of expansion.

It shall be understood that the words "acid" and "base" denote ability of various metal oxides to react with one another to form a salt, and that a flux essentially "neutral" in nature exhibits neither acid nor base characteristics.

More specifically, it has been found that a flux matrix formed essentially from the base ingredients, manganese oxide and an alkaline earth metal oxide, preferably calcium oxide, and the acid ingredients, oxides of titanium and aluminum, in such proportions as to be essentially neutral or slightly basic in nature, provides the viscosity and surface tension required to form a uniform "Inconel" bead free of depressions and surface irregularities. The aluminum oxide in the flux matrix, which may be either acidic or basic, assures the neutrality or basicity of the finally reacted and fused flux and the surface uniformity of the weld bead.

The calcium oxide is added in the form of calcium carbonate, the carbonate serving the additional, important function of providing a carbon monoxide shielding and reducing gas. At an arc temperature in excess of 8000° F., present during welding, the carbon dioxide formed by the break-down of calcium compounds and calcium dioxide at 1560° F. provides carbon monoxide and oxygen. It is found that an optimum amount of calcium carbonate prevents the formation of nickel and chromium oxides and results in an exceptionally clean bead.

To be self-removing, the base and acid ingredients are proportioned to have a solidification temperature approximately 100° to 200° below that of the weld metal For instance, with an "Inconel" metal solidifying at about 2600° F., the above-mentioned oxides are proportioned to solidify at about 2400° F. Further, the ingredients will provide a flux having a different coefficient of expansion than the weld metal. On cooling, the flux readily breaks and peels from the weld simply by brushing, leaving a clean weld surface suitable for machining or subsequent weld passes.

It is further proposed, in accordance with the invention, to obtain an optimum percentage of silica or silicates in the flux by replacing, substantially, the silica content, heretofore used, with the oxides of aluminum and titanium. However, a minimum silica content is present, there being added to the flux a small amount of silicate binder. An organic binder is unsatisfactory with "Inconel" metals because of the formation of hydrocarbons. It was found that the alumina reacted with the silica after fusion or melting of the flux to form mullite ($3Al_2O_3, 2SiO_2$) and that further, on cooling, the mullite and a portion of the titanium dioxide formed a separate mullite-rutile phase which solidified slightly before or simultaneously with the weld bead. The mullite in the form of small particles and the rutile in the form of glass-like slivers provided a protective shield over the surface of the molten weld metal and protected the weld from atmospheric contamination. It was further found that the mullite-rutile shield tended to slow down the cooling rate of the weld to improve the annealing of the weld, and was effective in shaping the weld. It is estimated that the proportion of the mullite-rutile phase in the molten or cooling composition is from about 10% to 15% of the total flux composition, of which mullite may be 8% to 10% and rutile may to 2% to 5%.

Mullite normally solidifies at 3300° F. and rutile at 2985° F., and with an "Inconel" type metal which solidifies at or about 2600° F., it is desirable to lower the solidification temperature of the mullite-rutile phase as far as possible. This is accomplished by providing a slight excess of silica over the $3Al_2O_3, 2SiO_2$ ratio bringing the solidification temperature of mullite down to about 2800° F., its eutectic temperature.

It is desirable to have the solidification temperature for the flux composition as a whole as low as possible, and this may be accomplished by adding to the composition from 4 to 8% of a modifying material, for instance, a fluoride salt. It was found that by adding lithium fluoride, the lithium was extremely effective as a cleaning agent in preventing the formation of nickel and chromium oxides. For instance, with an "Inconel" type metal consisting of approximately 72% nickel, 8% iron, and 15% chromium and minor proportions of other alloying elements, it was found that with from 4% to 5% lithium fluoride, no oxide deposits on the weld resulted. For the purposes of the present invention, a modifying material is defined as one functioning to lower the solidification temperature of the flux and improving the cleaning action of the flux.

Despite the use of alumina and rutile in place of silica, and take-up of silica by the formation of mullite, there is a strong tendency for silicon to transfer into the molten weld metal. Accordingly, it is proposed to add an amount of columbium which holds the silicon within the "Inconel" phase or solid solution and prevents the formation of a nickel-iron-silicon phase precipitating at grain boundaries and embrittling the weld. For instance, for the above "Inconel" type metal, it is proposed to add from 2% to 3% of ferro columbium. The addition of a greater or lesser amount of columbium seems to form the complex columbium-iron-silicon intermetallic compound which precipitates.

During the welding with nickel or nickel alloy metals, the temperature of the arc is in excess of 8000° F. At this temperature, there is a tendency to have a depletion of certain alloying elements in the deposited metal, and accordingly, it is proposed to provide for loss by the addition of manganese and chromium in the flux. For instance, with an "Inconel" metal of the above composition, an addition of approximately 2.5% ferro manganese and 1% ferro chromium provides satisfactory results. Assimilation of the alloying elements into the "Inconel" is facilitated by adding the alloys as ferro alloys.

For the forming of nickel or nickel alloy weld beads, with the present compositions, it is desitable to have a particle size from 6 to 60 mesh, or more desirably, 8 to 40 mesh. These ranges provide a homogeneous composition.

A greater understanding of the invention may be obtained by considering a typical example of the invention, in which a satisfactory welding flux composition was obtained by mixing the following finely ground materials in the proportions indicated:

| | |
|---|---|
| Manganox ($Nn_3O_4$) | 5 |
| Alumina ($Al_2O_3$) | 25 |
| Marble ($CaCO_3$) | 25 |
| Rutile ($TiO_2$) | 25 |
| Lithium fluoride (LiF) | 5 |
| Ferro manganese | 2.5 |
| Ferro columbium | 2.5 |
| Ferro chromium | 1.0 |
| Sodium silicate (anhydrous) | 9.0 |
| | 100.0 |

The percent given for sodium silicate is in the dry or anhydrous state. The sodium silicate was actually added as a liquid binding agent, sodium tetrasilicate ($Na_2Si_4O_9$), containing about 7.5% silicon dioxide.

The powdered materials were first thoroughly mixed to a homogeneous state and then the liquid tetrasilicate was added to the mixture. Mixing was continued and the mixture was dried until small granules of the composition were formed. The drying was carried out until the water content was reduced to less than ½ of a percent, and the composition was then screened to the desired particle size.

The flux composition was screened to an 8 to 40 mesh, and then disposed on the surface of a mild steel plate in submerged arc welding process. A double wire arrangement was used, the wires being positioned at a distance of ¼ inch from the plate, and ⅛ of an inch apart. The flux depth was 1 inch.

The composition of the welding wires was 70% to 72% nickel, 8% to 10% iron, 2.5% to 2.8% manganese, 3% to 3.2% titanium, 14% chromium minimum and other residual elements including about .05% carbon.

The weld cladding was formed on the steel plate by making two layers across the plate, the first layer being made at 26 to 28 volts (A.C.), 380 to 400 amps and at a rate of 10 inches per minute. The second layer was made at 24 to 26 volts (A.C.), 380 to 400 amps, and at a rate of 9 inches per minute.

During the welding, a molten layer of metal approximately ¼-inch in thickness was deposited on the plate surface, with a molten layer of flux floating on the surface of the molten metal. A layer of unfused flux in turn covered the molten flux, which, after cooling, was vacuumed up for reuse. During cooling, a mullite-rutile shield formed protecting the molten metal from atmospheric contamination, and subsequent to cooling of the flux matrix, the flux disintegrated on the bead and was readily brushed away leaving a clean weld surface. The final bead was found to be uniform and free of depressions, and had no oxide deposits. It was ductile, a 4" to 5" x ⅜" specimen being capable of a 180° bend around a ¾" radius mandrel without fissuring.

The matrix forming constituents were the manganese oxide, alumina, marble, rutile, and lithium fluoride; the alumina and rutile replacing or substantially replacing silica in the matrix. These ingredients have the melting temperatures indicated in Table 1, and in the proportions given, provide a matrix solidification temperature from 100° to 200° below that of the "Inconel" weld metal, or at about 2400° F. An "Inconel" metal of the composition given solidifies at about 2600° F.

*Table 1*

| Composition: | Melting point, ° F. |
|---|---|
| Calcium oxide (CaO) | 4500 |
| Manganese oxide (MnO) | 2912 |
| Rutile ($TiO_2$) | 2912 |
| Alumina ($Al_2O_3$) | 3722 |
| Lithium fluoride (LiF) | 1598 |

It is apparent that for nickel and other nickel alloys solidifying at different temperatures, it is possible and may be desirable to alter the proportions of matrix forming ingredients to achieve an effective self-removal of the flux.

The above proportions also gave the desired fluidity and surface tension, but, again, it is possible to vary the relative concentrations to achieve the desired results. For instance, it may be desirable to vary the alumina content. However, sufficient alumina must be provided to react with the silica, leaving a slight excess of silica, and to balance, with the rutile, the manganese and calcium oxide proportions. Too great an alumina content results in a mullite-corundum ($Al_2O_3$) composition having an eutectic temperature at about 3300° F., which sticks to the weld, and raises the solidification temperature of the flux matrix above that of the weld. Generally, satisfactory results are obtained with an alumina concentration of from about 20% to about 25%.

Some manganese oxide should be present in the flux. Besides being a highly effective and useful flux matrix forming ingredient, it serves to lower the matrix solidification temperature. From 4 to 5% manganese oxide seems to offer the best results, but with nickel base alloys solidifying at higher temperatures, a zero to 4% concentration may be used, or under certain other conditions, up to 10% may be desirable.

The titanium dioxide or rutile serves to replace the silica and react with the base ingredients. An upper limit is imposed on the alumina content by the solidification temperature of alumina, so that the rutile makes up the balance of acid forming ingredients in the composition. Generally, the rutile content should be from about 25 to 30%.

The calcium oxide was added to the composition in the form of calcium carbonate, the carbonate serving, as indicated, the additional function of providing a carbon monoxide shielding and reducing gas. The carbon monoxide also acts as an arc stabilizer. At the arc temperature above 8000° F., the carbon dioxide, formed by the breakdown of the carbonate (at 1560° F.), in turn provided carbon monoxide and oxygen.

The temperature of the arc, 8000° F. to 9000° F., was sufficient to decompose the calcium carbonate as follows:

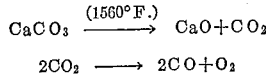

$$CaCO_3 \xrightarrow{(1560°F.)} CaO + CO_2$$

$$2CO_2 \longrightarrow 2CO + O_2$$

The carbon monoxide reacts with the nickel oxide (or chromium oxide) to form a tetracarbonyl [for instance, $Ni(CO)_4$] which has a low vaporization point and vaporizes as a gas. For the above nickel alloy, and the welding conditions used, a less than 15% carbonate concentration produced insufficient carbon monoxide and left a nickel-oxide deposit on the bead. A calcium carbonate concentration of more than 35% produced a clean bead, but appeared to give too basic a flux for good bead formation. Further, the resulting gas pressure was excessive and seemed to induce gas porosity in the bead. In general, suitable results will be obtained with a carbonate content from 15% to 25%. For instance, in the above example, there was no evidence of the formation of nickel oxide, or of porosity and inclusions, conditions to which nickel and nickel base alloys are highly susceptible.

The lithium fluoride is added to lower the solidification temperature of the flux composition, the lithium also serving as a cleaning agent to reduct the nickel oxide and chromium oxide deposits. Towards this end, a 4% to 8% addition of lithium fluoride is generally sufficient, although it may be desirable to use other modifying agents, for instance, calcium fluoride and cryolite ($Na_3AlF_6$). A lithium compound seems to be most effective as a cleaning agent.

The amount of silicate binder added may be varied although a proportion sufficient to give 9% sodium silicate sems to offer optimum results. A lesser amount is insufficient as a binder, and a greater amount produces too wet a composition. Potassium silicate ($K_2Si_4O_9$) may also be used as a binder.

The composition analysis given is extremely effective with "Inconel" of the description given, but it is apparent that the principles involved can be applied to other nickel alloys, and the composition can be varied, depending on the melting points for the weld metals, the compositions of the weld metals, and the results sought.

For instance, the ferro alloys of chromium and manganese compensate for welding losses in the "Inconel" rods, but is apparent that, depending on the composition of the rods and properties sought in the weld, other ferro alloys may be used.

Also the ferro columbium may be omitted in instances where the silicon content of the weld is not as critical. The sodium silicate contributes to obtaining the desired fluidity in the flux, but other silicate binders may be used, for instance potassium silicate.

Although the invention has been specifically described with respect to a submerged arc welding metal cladding process, the compositions of the invention are useful in a submerged arc welding process in the joining of dissimilar metals with nickel base alloys (presently done using manual techniques) and other welding processes involving the use of nickel and nickel base alloys.

Other compositions or modifications will be apparent to those skilled in the art and it is intended that the invention be limited only as defined in the following claims.

What is claimed is:

1. A welding composition for submerged arc welding of nickel and nickel base weld metals, consisting essentially of matrix forming constituents consisting of base ingredients including an alkaline earth metal carbonate and acid ingredients including titanium dioxide and alumina proportioned so as to be essentially neutral, a minor proportion of a silicate binder, and a minor proportion of a modifying material, said alumina being present in an amount sufficient to combine with the silicate to form a separate mullite phase having a slight excess of silica to lower the solidification temperature of the mullite to its eutectic temperature of 2800° F., said flux matrix having a solidification temperature slightly below that of the weld metal and said alumina further being present in an amount sufficient to react with said base and other acid ingredients of said matrix forming constituents so that the flux matrix has a pH factor ranging from approximately neutral to slightly basic.

2. A welding composition according to claim 1 wherein said alkaline earth metal carbonate is calcium carbonate and is present in an amount from about 15% to about 25%.

3. A welding composition according to claim 1 wherein said modifying material is lithium fluoride present in an amount from about 4% to about 5%.

4. A welding composition for submerged arc welding of nickel and nickel base weld metal, consisting essentially of matrix forming constituents consisting of base ingredients including an alkaline earth metal carbonate and manganese oxide and acid ingredients including titanium dioxide and alumina proportioned so as to be essentially neutral, a minor proportion of a silicate binder, from about 2% to about 3% ferro columbium to prevent the formation of a nickel-iron-silicon phase precipitating at grain boundaries of the weld bead, and a modifying material, said alumina being present in an amount sufficient to combine with the silicate to form a separate mullite phase having a slight excess of silica to lower the solidification temperature of the mullite to its eutectic temperature of 2800° F., said flux matrix having a solidification temperature slightly below that of the weld metal and said alumina further being present in an amount sufficient to react with said base and other acid ingredients of said matrix forming constituents so that the flux matrix has a pH factor ranging from approximately neutral to slightly basic.

5. A welding composition for submerged arc welding of a weld metal having from about 70% to 72% nickel, about 8% to 10% iron, 14% chromium minimum, and minor proportions of other elements, consisting essentially of matrix forming constituents consisting of base ingredients including from about 15% to about 25% calcium carbonate and about 4% to about 10% manganese oxide and acid ingredients including from about 25% to about 30% rutile and from about 20% to about 25% alumina proportioned so as to be essentially neutral, from about 8% to about 10% of a silicate binder and from about 4% to about 5% of lithium fluoride; said composition further including from about 2% to about 3% ferro columbium, and incidental alloying elements; said alumina being present in an amount sufficient to combine with the silicate to form a separate mullite phase having a slight excess of silica to lower the solidification temperature of the mullite to its eutectic temperature of 2800° F., said flux matrix having a solidification temperature slightly below that of the weld metal and said alumina further being present in an amount sufficient to react with said base and other acid ingredients of said matrix forming constituents so that the flux matrix has a pH factor ranging from approximately neutral to slightly basic.

6. A composition according to claim 5 wherein said ingredients are intermixed, dried and screened into free flowing granular particles having a particle size range from about 6 to 60 mesh.

7. A welding composition for submerged arc welding of nickel, chromium, and iron alloys, consisting essentially of the following constituents:

| | Percent |
|---|---|
| $Mn_3O_4$ | 4–10 |
| $Al_2O_3$ | 20–25 |
| $CaCO_3$ | 15–25 |
| $TiO_2$ | 25–30 |
| Modifying material | 4–5 |
| FeCb | 2–3 |
| Sodium silicate (added as $Na_2Si_4O_9$) | 8–10 |
| Alloying elements | 3.5–6 |

8. A welding composition for submerged arc welding of nickel-chromium-iron alloys which contain about 70% to 72% nickel, 8% to 10% iron, more than 14% chromium and minor proportions of other alloying elements, consisting essentially of the following constituents:

| | Percent |
|---|---|
| $Mn_3O_4$ | 5 |
| $Al_2O_3$ | 25 |
| $CaCO_3$ | 25 |
| $TiO_2$ | 25 |
| LiF | 5 |
| $Na_2Si_4O_9$ (anhydrous) | 9.0 |
| FeCb | 2.5 |
| FeCr | 1.0 |
| FeMn | 2.5 | said ingredients being intermixed, bound together and dried into free flowing granular particles having a particle size of from 6 to 60 mesh.

9. A welding composition for submerged arc welding of nickel and nickel base weld metals, consisting essentially of matrix forming constituents consisting of base ingredients including an alkaline earth metal carbonate and manganese oxide and acid ingredients including titanium dioxide and alumina proportioned so as to be essentially neutral, a small proportion of a silicate binder, and a small proportion of a modifying material, said alumina being present in an amount sufficient to combine with the silicate to form with a portion of the titanium dioxide a separate mullite-rutile phase having a slight excess of silica to lower the solidification temperature of the mullite to its eutectic temperature of 2800° F., said flux matrix having a solidification temperature slightly below that of the weld metal, said alumina further being present in an amount sufficient to react with said base and other acid ingredients of said matrix forming constituents so that the flux matrix has a pH factor ranging from approximately neutral to slightly basic.

References Cited by the Examiner

UNITED STATES PATENTS

| 2,043,960 | 6/36 | Jones et al. | 148—26 |
|---|---|---|---|
| 2,150,625 | 3/39 | Lloyd et al. | 148—26 |
| 2,258,675 | 10/41 | Conn | 219—73 |
| 2,458,039 | 1/49 | Wait | 106—51 |
| 2,471,242 | 5/49 | Royster | 106—51 |
| 2,507,751 | 5/50 | Bennett | 148—26 |
| 2,544,334 | 3/51 | Linnert | 148—26 |
| 2,701,779 | 2/55 | Conn | 148—26 |
| 3,023,301 | 2/62 | Claussen | 148—23 |

FOREIGN PATENTS 768,543  2/57  Great Britain.

DAVID L. RECK, *Primary Examiner.*

RAY K. WINDHAM, WINSTON A. DOUGLAS,
*Examiners.*